(12) United States Patent
Levy et al.

(10) Patent No.: US 9,836,389 B2
(45) Date of Patent: Dec. 5, 2017

(54) TEST DATA GENERATION UTILIZING ANALYTICS

(71) Applicant: International Business Machines Corporation, Armonk, NY (US)

(72) Inventors: Ronen Levy, Haifa (IL); Tamer Salman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/769,329

(22) Filed: Feb. 17, 2013

(65) Prior Publication Data
US 2014/0237450 A1   Aug. 21, 2014

(51) Int. Cl.
*G06F 11/36* (2006.01)

(52) U.S. Cl.
CPC ...... *G06F 11/3684* (2013.01); *G06F 11/3664* (2013.01); *G06F 11/3688* (2013.01)

(58) Field of Classification Search
None
See application file for complete search history.

(56) References Cited

U.S. PATENT DOCUMENTS

| | | | |
|---|---|---|---|
| 8,001,422 B1 * | 8/2011 | Sun et al. | 714/25 |
| 8,418,000 B1 * | 4/2013 | Salame | G06F 11/079 714/26 |
| 2003/0070119 A1 * | 4/2003 | Dallin | G06F 11/3684 714/38.14 |
| 2009/0125976 A1 * | 5/2009 | Wassermann et al. | 726/1 |
| 2009/0164478 A1 * | 6/2009 | Natanov et al. | 707/100 |

(Continued)

FOREIGN PATENT DOCUMENTS

GB     2484382     4/2012

OTHER PUBLICATIONS

Michael et al., "Generating software test data by evolution," 2001, IEEE Transactions on Software Engineering, vol. 27, Issue: 12, pp. 1085-1110, downloaded from the Internet on Jul. 17, 2017 at <ulr>:http://ieeexplore.ieee.org/stamp/stamp.jsp?arnumber=988709.*

(Continued)

*Primary Examiner* — Tuan Q. Dam
*Assistant Examiner* — Stephen Berman
(74) *Attorney, Agent, or Firm* — Ziu Glezberg

(57) ABSTRACT

A method and apparatus for generating test by data utilizing analytics. The method, the method comprising: receiving a characteristic of a first data set, the first data set representative of data to be used by a computer program application; receiving a second data set, the second data set representative of additional data to be used by the computer program application; performing data analytics on the second data set for extracting a set of properties of the second data set; determining a similarity degree between the set of properties and the characteristic of the first data set; and responsive to the similarity degree being below a threshold, generating test data based on the set of properties.

15 Claims, 3 Drawing Sheets

(56) References Cited

U.S. PATENT DOCUMENTS

| | | | |
|---|---|---|---|
| 2009/0164848 A1* | 6/2009 | Heidasch et al. | 714/38 |
| 2009/0182756 A1 | 7/2009 | Kang et al. | |
| 2011/0066890 A1* | 3/2011 | Bassin et al. | 714/37 |
| 2011/0072417 A1* | 3/2011 | Dhurjati et al. | 717/124 |
| 2012/0084324 A1 | 4/2012 | Lloyd et al. | |
| 2012/0179485 A1* | 7/2012 | Saneii | G06Q 50/22 705/2 |
| 2012/0179935 A1* | 7/2012 | Wang et al. | 714/32 |
| 2012/0260129 A1* | 10/2012 | Wilson | G06F 11/3688 714/32 |
| 2013/0139130 A1* | 5/2013 | Anjan et al. | 717/131 |
| 2013/0326471 A1* | 12/2013 | Nucci | G06F 8/10 717/105 |
| 2014/0006459 A1* | 1/2014 | Guo | G06F 11/3684 707/805 |
| 2014/0006866 A1* | 1/2014 | Clifford | G06F 11/3684 714/32 |
| 2014/0013164 A1* | 1/2014 | Ma | G06F 11/3688 714/38.1 |
| 2015/0169433 A1* | 6/2015 | Bryl | G06F 11/3684 714/38.1 |

OTHER PUBLICATIONS

Eno et al., "Generating Synthetic Data to Match Data Mining Patterns," 2008, IEEE Internet Computing, vol. 12, Issue: 3, pp. 78-82, downloaded from the Internet on Jul. 17, 2017 at <ulr>:http://ieeexplore.ieee.org/stamp/stamp.jsp?arnumber=4510885.*

Demillo et al., "Constraint-based automatic test data generation," 1991, IEEE Transactions on Software Engineering, vol. 17, Issue: 9, pp. 900-910, downloaded from the Internet on Jul. 17, 2017 at <ulr>:http://ieeexplore.ieee.org/stamp/stamp.jsp?arnumber=92910.*

Taneja et al., "MODA: automated test generation for database applications via mock objects", In Proceedings of the IEEE/ACM international conference on Automated software engineering, pp. 289-292, 2010.

Emmi et al., "Dynamic test input generation for database applications", In Proceedings of the 2007 international symposium on Software testing and analysis (ISSTA '07), pp. 151-162, 2007.

Adir et al., "Dynamic Test Data Generation for Data Intensive Applications", in proceedings of the 7th Hafia Verifiction Conference 2011 (HVC'11), 2011.

* cited by examiner

TEST DATA GENERATION UTILIZING ANALYTICS

TECHNICAL FIELD

The present disclosure relates to generating data in general, and to generating data for testing applications in particular.

BACKGROUND

Computerized devices and systems control almost every aspect of our life, both as individuals and as a society. Many of the computerized systems gather or use significant amounts of data about products, processes, individuals, and other entities. The data is typically organized for modeling relevant aspects of reality, in a manner that supports processes requiring this information. The data is often stored in the form of a database, wherein the term database may refer to the way users view the data collection, or to the logical and physical materialization of the data, in files, computer memory, or computerized storage.

In some situations, a deadlock may be faced, wherein the development and particularly the testing and proofing of applications require the existence of sufficient data, otherwise certain functionalities cannot be tested. However, generating the data required for testing and populating a database with such information, may require the existence of the application itself. Even further, the data contents, structure and requirements may be non-final and may evolve throughout the development of the application.

Some methods provide for generating data for testing an application. One method relates to manually fabricating data. However, such operation may require significant manual labor and may thus be inefficient and infeasible for obtaining a large corpus of data. Furthermore, fabricated data may be non-realistic, inconsistent or meaningless, or at least may have distributions or other properties which are significantly different than those of real life data based on real scenarios and population.

In some cases, data may exist but may be inaccessible to an application developer, due to laws, privacy protection regulations, or other limitations such as organizational policy. For example, sensitive health or financial data, even if such exist, may be restricted and cannot be shared with application developers or QA staff members, whether such personnel belongs to the organization maintaining the data or are external to the organization.

If data exists but is inaccessible due to privacy limitations, using masking or scrambling to hide sensitive details may not always suffice. For example, data may be exposed when transferred to another location, or some sensitive data may leak due to mistakes, bugs or malicious actions. In other cases, if the total volume of the data that is available is relatively small, masking some identifying details may not be enough to conceal the identity of subjects or other entities.

Other data generation methods may relate to automatic generation of constraint-based random data. However, such methods may be infeasible or inefficient for large applications with a multiplicity of constraints.

Yet other methods relate to random data generation, which may provide irrelevant and useless data which does not represent real-world data and does not comply with the relevant constraints.

All the above-mentioned methods may be employed, but even if useful data is generated, it may still not be easily extended, updated or improved when more data is required, when the requirements change or when the real data to be used by the application changes.

BRIEF SUMMARY

One exemplary embodiment of the disclosed subject matter is a computer-implemented method performed by a computerized device, comprising: receiving a first data set, the first data set representative of data to be used by application computer program; performing data analytics on the first data set for extracting at least one property of the first data set; and generating test data based on the at least one property of the first data set, wherein the test data is generated is generated without using the first data set.

Another exemplary embodiment of the disclosed subject matter is a computer-implemented method performed by a computerized device, comprising: receiving a characteristic of a first data set, the first data set representative of data to be used by a computer program application; receiving a second data set, the second data set representative of additional data to be used by the computer program application; performing data analytics on the second data set for extracting a set of properties of the second data set; determining a similarity degree between the set of properties and the characteristic of the first data set; and responsive to the similarity degree being below a threshold, generating test data based on the set of properties.

Yet Another exemplary embodiment of the disclosed subject matter is an apparatus having a processing unit and a storage device, the apparatus comprising: a data analytics tool for extracting a property set from a data set representative of data to be used by an application computer program; a similarity degree determination component for determining a similarity degree between the property set extracted from the data set and a characteristic of another data set; and a test data generation component for generating test data based upon the property set extracted from the data set, wherein said test data generation component is responsive to the similarity degree being below a threshold.

Yet another exemplary embodiment of the disclosed subject matter is a computer program product comprising: a non-transitory computer readable medium; a first program instruction for receiving a characteristic of a first data set, the first data set representative of data to be used by a computer program application; a second program instruction for receiving a second data set, the second data set representative of additional data to be used by the computer program application; a third program instruction for performing data analytics on the second data set for extracting a set of properties of the second data set; a fourth program instruction for determining a similarity degree between the set of properties and the characteristic of the first data set; and a fifth program instruction for generating test data based on the set of properties, responsive to the similarity degree being below a threshold, wherein said first, second, third, fourth and fifth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
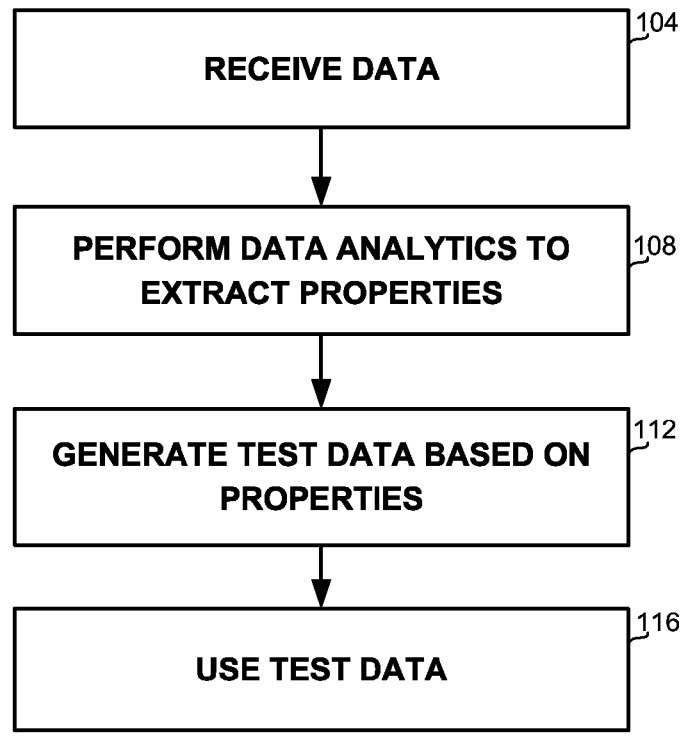
FIG. 1 shows a flowchart of steps in a method for initial generation of test data, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the absence, insufficiency or inaccessibility of test data, to be used by a developed or tested application. Preferably, the data has similar characteristics to those of real world data. For example, certain fields may have the same distribution as the real world data. As another example, the values of certain fields should comply with some constraints. Other characteristics may be used to determine similarity between the data and the real world data.

Another technical problem dealt with by the disclosed subject matter is the need to repeat the test generation in order to expand, update or enhance the test data upon changing needs, wherein new needs may include adding test data, deleting records and generating others, changing record parts, or otherwise changing the data set.

Some methods for fabricating data are described in U.S. patent application Ser. No. 13/295,070 which is incorporated herein by reference in its entirety for all purposes.

One technical solution comprises a method, apparatus and product for generating or improving test data based on analytics of existing data set.

A data analytics tool may extract a set of properties of the real data set. The properties may relate to distributions of the values of certain fields, constraints, or the like.

The set of properties may then be used for generating test data based on the extracted set of properties, thus providing test data which complies with the extracted properties. In some alternatives, properties provided by an external source such as a human operator or another system may be used in addition to the extracted property set.

The properties may be saved together with, or in association with the test data.

In some embodiments, when the needs change, a new real data set may be received, and its properties may be extracted by a data analytics tool. A degree of similarity may then be determined by comparing the properties of the real data set and the properties of the previously generated test data.

Alternatively or additionally, a degree of similarity may be determined between the new real data set and the previously received real data set, or between the new real data set and the previously generated test data.

Based upon the degree of similarity, whether the degree relates to comparing the data sets or the property sets, a decision may be made whether it is required to update the test data or not. If it is required to update, new data is generated based upon the new property set. In some embodiments, based on the determined similarity, some new test data may be generated and added to the previously generated test data rather than regenerating all required data, thus saving processing power and time, and promoting continuity.

The comparison and updating may be carried out periodically, upon a predetermined change measurement of the real world data, a specific request by a person or by another system, or any combination of the above or additional conditions.

Generating the test data may include testing the generated data for quality or sufficiency, wherein if the generated test data or its quality is insufficient, additional generation cycles may be performed.

It will be appreciated that although the term data set relates to real or fabricated received data, and the term test data relates to generated data, they may be structurally identical, for example comprise the same data structures or database scheme. However, some differences may be introduced when generating the test data, such as adding fields to data structures, adding tables or columns to a database scheme, or the like.

One technical effect of the disclosed subject matter is the automatic generation of test data that is consistent with the real world data, for example has the same properties. The data is generated without significant manual effort, and is adapted to the problem or to the relevant applications that consume the data, since it carries the same characteristics.

Another technical effect of the disclosed subject matter is the repeatability of the test data generation if required. When conditions change, the generated test data or its properties and the newly required data set or its properties may be compared and a similarity degree may be determined. Upon the determined degree of similarity, it may be decided whether and what amount of new test data is to be generated.

The disclosed subject matter thus enables the generation of large quantities of suitable updated test data based upon a real world data set which may be insufficient or inaccessible, without manual effort, and without infringing privacy or other limitations.

Referring now to FIG. 1 showing a flowchart of steps in a method for fabricating data for database applications.

On step 104, relevant data may be received from any source, such as real world data collected from actual sources, manually generated data, or the like. The data is assumed to be representative of data to be used by one or more applications, for example in order to test the applications.

On step 108, an analytics tool may process the data to extract a set of one or more properties which may characterize the data, such as distribution of one or more attributes, interdependency between attributes, or the like.

For example, analyzing a database may provide that a values in a field in one of the database tables may be comprise a pattern, which may distribute as follows, wherein N stands for a digit and A stands for a letter:

50%: NNAANNN;
30%: NNAAANN; and
20%: NNAAAAN.

The analytics tool may be any appropriate tool, such as IBM InfoSphere Discovery engine, provided by International Business Machines of Armonk, N.Y., United States. Some properties may be provided by another source such as a human operator or another system.

On step 112, test data may be generated based upon the properties extracted by the analytics tool. In the above example, the data may have the same distribution of the relevant column as the distribution above. The properties extracted on step 108 may be stored with the test data, or in a separate location which may be associated with the test data. The data may be generated using any required method or solving tool, such as but not limited to a Constraint Satisfaction Problem (CSP) solver, a satisfiability (SAT) solver, a Satisfiability Modulo Theories (SMT) solver, or any other solvers.

On step 116 the data generated on step 112 may be used by the relevant application. The data may have the same properties as those extracted from the real data by the analytics tool, and may thus be suitable for testing the application.

Figure 2:
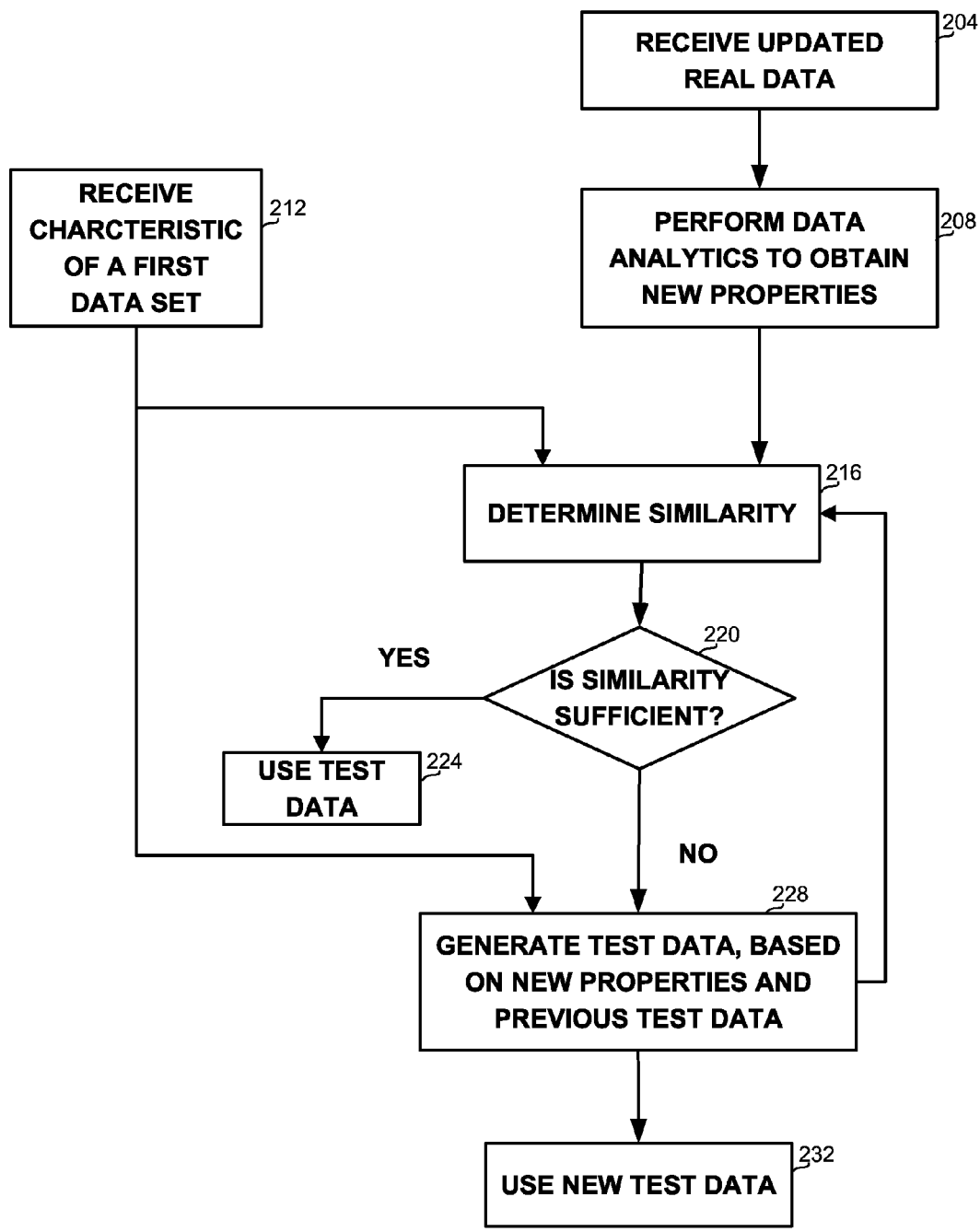
FIG. 2 shows a flowchart of steps in a method for repeated generation of test data, in accordance with some exemplary embodiments of the disclosed subject matter.

Referring now to FIG. 2, showing a flowchart of steps in a method for repeated generation of test data.

On step 204 updated real data is received. The data may be received, similarly to the data received on step 104, from any source, including real world data, manually generated data, or the like. The data may or may not be received from the same source as the data received on step 104 of FIG. 1 above. In some embodiments, different parts of the data may be received from different sources.

On step 208, data analytics may be performed over the new data received on step 204, or over the new data together with the data received on step 104 above. The data analytics may be performed using the same data analytics tool used for analyzing the data on step 108 or by another tool.

On step 212 a characteristic of the first data set may be received, retrieved or otherwise obtained. The characteristic may be one or more properties obtained from the first data set by data analytics, the first data set, or the first test data generated using the properties obtained from the first data set.

On step 216, a similarity degree may be determined between the properties determined on step 208 for the new data or for the combined data, and the characteristic of the first data set. The characteristic of the first data set may be the properties extracted from the first data set, some or all of the first data set, or a first test data generated based upon the first data set.

On step 220 the similarity is examined for sufficiency. Sufficiency may relate to the similarity exceeding a threshold, wherein the threshold may be user-defined or automatically predetermined, may take into account the amount of data, or the like. Determining the threshold may also include reusing the analytics tool with the previously received data under different settings, or extracting different properties.

If the similarity degree is determined to be sufficient, it may not be required to generate new test data.

If, however, the data is substantially different, then new data may be generated on step 228, in accordance with the newly determined properties. The data may be generated also using the first data set or the first set of properties extracted from the first data set. Depending on the similarity degree, it may also be determined that only some new data is to be generated and added to the previously generated data. The amount of new data to be generated may also depend on the similarity degree and on a predetermined sensitivity level.

For example, if the newly received data has properties as follows for the specific field:

49.999%: NNAANNN;
30%: NNAAANN;
20% NNAAAAN; and
0.0001%: NNAAAAA, then it may be determined that the new real data is similar enough to the previous data, and no regeneration is required. If, however, the newly received data has properties as follows:

47.5%: NNAANNN;
28.5%: NNAAANN;
19%: NNAAAAN; and
5%: NNAAAAA, then it may be determined that the similarity between the new data and the previous data is insufficient, and new data has to be generated. For example, it may be determined that generating additional 5% of the data, with the value complying with the pattern of NNAAAAA and adding it to the previously generated data, will provide test data having the same distribution, since the proportions between the other values remained substantially the same.

If the data having the new value complying with the pattern of NNAAAAN has a particular distribution in another field, this distribution will be indicated in the extracted properties and reflected also in the newly generated data.

It will be appreciated that in some cases, for example when the total size of the test data is limited, and the required distribution of some of the attributes cannot be maintained with the number of items to be generated, some items may be changed, or some items may be deleted and others may be created. For example, suppose a property of a data set was a distribution of 50% males and 50% females and no constraint was provided regarding ages. The generated test data consisted of 100 cases comprising 50% males, 50% females, 50% children and 50% adults. If a new data set is provided, comprising 70% children and 30% adults, and altogether 110 cases are required, then some of the earlier generated test data may have to be either amended or replaced by new records. If, however, there is no limitation on the size of the data, then it may be possible to comply with the properties by only adding cases.

If new test data was generated on step 228, the new test data may be used on step 232, instead of or in addition to the previously generated test data.

Otherwise, if the properties are similar enough and no new test data is generated, then the previously generated test data may be used on step 224.

Figure 3:
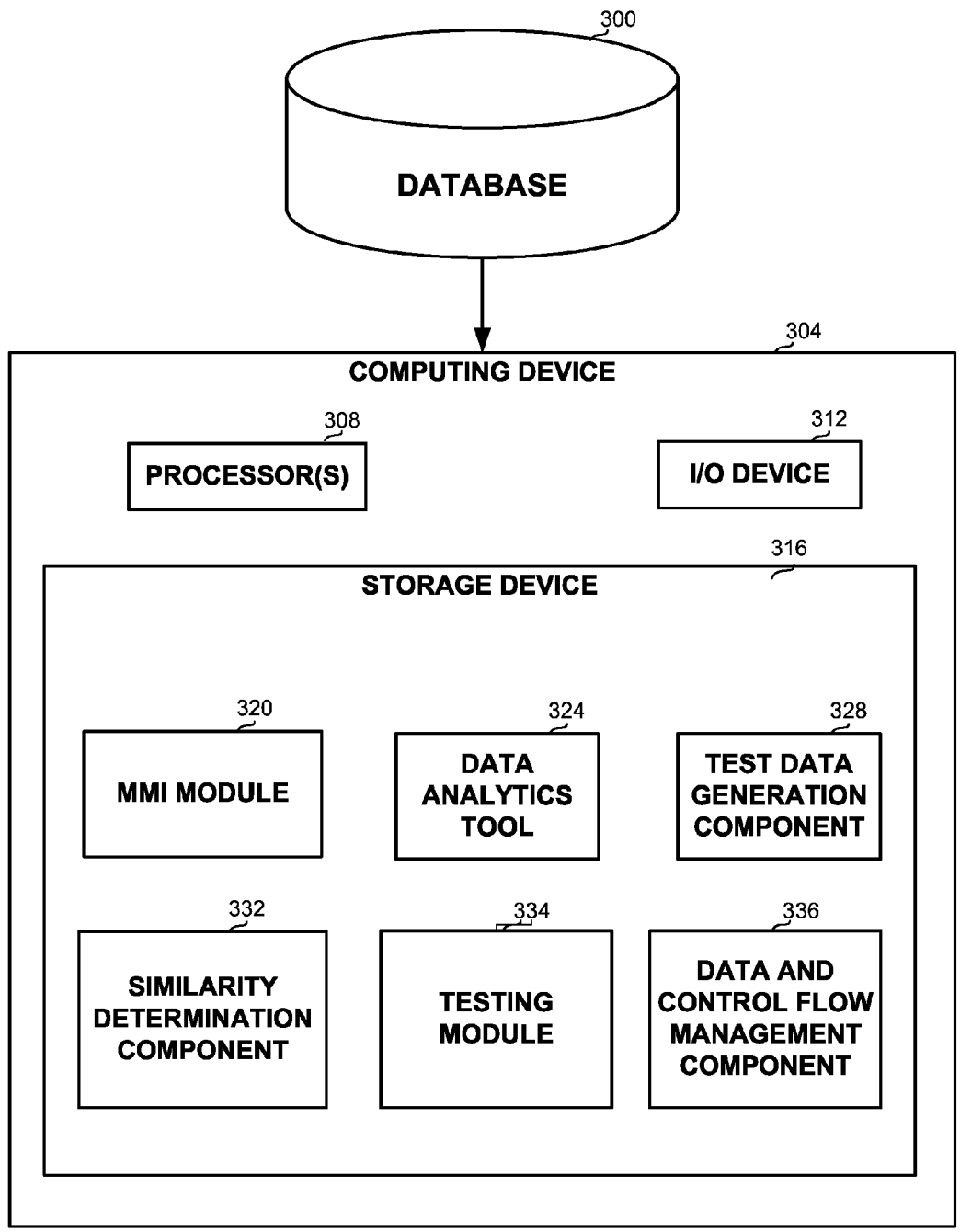
FIG. 3 shows a block diagram of components of an apparatus for test data generation, in accordance with some exemplary embodiments of the disclosed subject matter.

Referring now to FIG. 3, showing a block diagram of components of an apparatus for test data generation.

The environment may comprise a database 300, which may be stored on any one or more storage devices such as a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. The database may be a relational database, a hierarchical database, object-oriented database, document-oriented database, or any other database.

The environment also comprises a computing device 304, which may comprise one or more processors 308. Any of processors 304 may be a Central Processing Unit (CPU), a microprocessor, an electronic circuit, an Integrated Circuit (IC) or the like. Alternatively, computing device 304 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 308 may be utilized to perform computations required by computing device 304 or any of it subcomponents.

In some embodiments, computing device 304 may comprise an input-output (I/O) device 312 such as a terminal, a display, a keyboard, a mouse, a touch screen, an input device or the like to interact with the system, to invoke the system and to receive results. It will however be appreciated that the system can operate without human operation and without I/O device 312.

Computing device 304 may comprise one or more storage devices 316 for storing executable components, and which may also contain data during execution of one or more components. Storage device 316 may be persistent or volatile. For example, storage device 316 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 316 may retain program code operative to cause any of processors 308 to perform acts associated with any of the steps shown in FIG. 1 or FIG. 2 above, for example analyzing data for extracting properties, generating data in accordance with the extracted properties, or others.

The components detailed below may be implemented as one or more sets of interrelated computer instructions, executed for example by any of processors 308 or by another processor. The components may be arranged as one or more executable files, dynamic libraries, static libraries, methods, functions, services, or the like, programmed in any programming language and under any computing environment.

In some exemplary embodiments of the disclosed subject matter, storage device 316 may comprise or be loaded with a man machine interface (MMI) module 320. MMI module 320 may be utilized to receive input or provide output to and from the apparatus, for example receiving specific user commands or parameters related to the apparatus, storing and retrieving information to and from a database, providing output, or the like.

Storage device 316 may comprise one or more data analytics tool 324 for receiving data and extracting properties of the data, such as IBM InfoSphere Discovery engine, provided by International Business Machines of Armonk, N.Y., United States. Data analytics tool 324 may alternatively be stored on or loaded to another computing platform in connection with computing device 304.

Storage device 316 may comprise test data generation component 328 for receiving properties of real or manually generated data sets, and generating test data that complies with the properties.

Storage device 316 may also comprise similarity determination component 332 for determining similarity degree, or difference measurement between two sets of properties extracted from two sets of data. Additionally or alternatively, similarity may be determined between the newly received data and the previously generated test data or previously received test data.

Storage device 316 may also comprise testing module 334 for testing the application on any test data or data set, and in particular the test data generated upon the new data set of characteristics, stand alone or combined with test data generated upon the first data set.

Storage device 316 may also comprise data and control flow management component 336, for managing the information and control flow among the detailed components. For example, data and control flow management component 336 may be responsible and comprise corresponding components for transferring the real data to data analytics tool 324, the extracted properties to test data generation tool 328, receiving settings from a user, storing data into database 300, retrieving data from database 300, or the like.

The method and apparatus may be used for generating data which may be used for developing and testing applications for which not enough data is available or accessible. Since no real data is used in the generation, no privacy or other regulations related to the data are infringed. The generated test data represents the real data and is thus reliable and can be used for testing the application.

The method and apparatus provide for updating the test data when conditions change, such that the new data may replace or be added to the previously generated data.

It will also be appreciated that the method and apparatus are scalable, and adding further data does not incur higher resource consumption than adding initial data.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
    receiving a characteristic of a first data set, the first data set representative of data to be used by a computer program application;
    receiving a second data set, the second data set comprising real data and representative of additional data to be used by the computer program application;
    performing data analytics on the second data set for extracting a set of properties of the second data set, wherein performing the data analytics comprises analyzing a length and order of one or more digit and letter sequences, and the set of properties of the second data set comprises a distribution of patterns indicating how often each digit and letter sequence, of the one or more digit and letter sequences, occurs within values in a field in the second data set;
    determining a similarity degree between the set of properties and properties extracted from the first data set; and
    responsive to the similarity degree being below a threshold, generating test data based on the set of properties;
    wherein said steps of receiving a characteristic of a first data set, receiving a second data set, performing, determining and generating are carried out by a single entity.

2. The computer-implemented method of claim 1, wherein the characteristic of the first data set is a first set of properties of the first data set.

3. The computer-implemented method of claim 2, wherein the test data is added to a first test data generated upon the first set of properties, and wherein the first test data and the test data are used for testing the computer program application.

4. The computer-implemented method of claim 1, wherein the characteristic of the first data set is a first test data generated upon the first data set.

5. The computer-implemented method of claim 4, wherein the test data is added to the first test data, and wherein the first data set and the test data are used for testing the computer program application.

6. The computer-implemented method of claim 1, wherein the test data is used for testing the computer program application instead of previously generated test data.

7. The computer-implemented method of claim 1 further comprising using previous test data, generated upon the characteristic of the first data set for testing the computer program application, responsive to the similarity degree exceeding the threshold.

8. The computer-implemented method of claim 1 further comprising using the test data for testing the computer program, application, responsive to the similarity degree being below the threshold.

9. An apparatus having a processing unit and a storage device, the apparatus comprising:
   a data analytics tool for extracting a property set from a data set comprising real data and representative of additional data to be used by a computer program application, wherein the extracting the property set from the data set comprises analyzing a length and order of one or more digit and letter sequences, and the property set comprises a distribution of patterns indicating how often each digit and letter sequence, of the one or more digit and letter sequences, occurs within values in a field in the data set;
   a similarity degree determination component for determining a similarity degree between the property set extracted from the data set and a properties extracted from another data set, the another data set representative of data to be used by the computer program application; and
   a test data generation component for generating test data based upon the property set extracted from the data set, wherein said test data generation component is responsive to the similarity degree being below a threshold;
   wherein said data analytics tool, similarity degree determination component and test data generation component reside on the storage device, whereby the extracting, determining and generating are set to be carried out by a single entity.

10. The apparatus of claim 9, wherein the characteristic of the other data set is a property set of the other data set.

11. The apparatus of claim 9, further comprising a testing module for testing the computer program application, wherein the testing module is configured to use the data set to test the application computer program in case the similarity degree exceeds the threshold.

12. The apparatus of claim 9 further comprising a testing module for testing the computer program application, wherein the characteristic of the another data set is another test data generated upon the another data set, and wherein the testing module is configured to use the test data and the other test data to test the computer program application in case the similarity degree is below the threshold.

13. The apparatus of claim 9 further comprising a testing module for testing the computer program application, wherein the characteristic of the other data set is another test data generated upon the other data set, and wherein the testing module is configured to use the another test data to test the computer program application in case the similarity degree is below the threshold.

14. A computer program product comprising:
   a non-transitory computer readable medium;
   a first program instruction for receiving a characteristic of a first data set, the first data set representative of data to be used by a computer program application;
   a second program instruction for receiving a second data set, the second data set comprising real data and representative of additional data to be used by the computer program application;
   a third program instruction for performing data analytics on the second data set for extracting a set of properties of the second data set, wherein performing the data analytics comprises analyzing a length and order of one or more digit and letter sequences, and the set of properties of the second data set comprises a distribution of patterns indicating how often each digit and letter sequence, of the one or more digit and letter sequences, occurs within values in a field in the second data set;
   a fourth program instruction for determining a similarity degree between the set of properties and properties extracted from the first data set; and
   a fifth program instruction for generating test data based on the set of properties, responsive to the similarity degree being below a threshold, wherein said first, second, third, fourth and fifth program instructions are stored on said non-transitory computer readable medium, wherein said first, second, third, fourth and fifth program instructions are directed to a single entity to be carried out thereby.

15. The computer-implemented method of claim 1 further comprising modifying previously generated test data, said modifying comprises at least one of: changing one or more items of the previously generated test data; and, deleting one or more items of the previously generated test data to be replaced by the test data.

* * * * *